United States Patent
Hernandez-Oliver et al.

(10) Patent No.: US 10,094,487 B2
(45) Date of Patent: Oct. 9, 2018

(54) MAGNET CARRIER ASSEMBLY

(71) Applicant: Tyco Electronics Corporation, Berwyn, PA (US)

(72) Inventors: Salvador Hernandez-Oliver, Winston-Salem, NC (US); Suraj K. Alva, Troy, MI (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 960 days.

(21) Appl. No.: 14/520,005

(22) Filed: Oct. 21, 2014

(65) Prior Publication Data
US 2015/0110553 A1  Apr. 23, 2015

Related U.S. Application Data

(60) Provisional application No. 61/894,618, filed on Oct. 23, 2013.

(51) Int. Cl.
| | | |
|---|---|---|
| *F16K 37/00* | (2006.01) | |
| *G01D 5/14* | (2006.01) | |
| *G01D 11/30* | (2006.01) | |

(52) U.S. Cl.
CPC ......... *F16K 37/0033* (2013.01); *G01D 5/145* (2013.01); *G01D 11/30* (2013.01); *Y10T 29/4978* (2015.01); *Y10T 29/49826* (2015.01); *Y10T 403/7075* (2015.01)

(58) Field of Classification Search
CPC .. F16B 21/02; F16B 21/04; F16B 7/20; F16B 7/22; F16K 37/0033
See application file for complete search history.

(56) References Cited

U.S. PATENT DOCUMENTS

| | | | | |
|---|---|---|---|---|
| 5,397,196 | A | * | 3/1995 | Boiret .................. F16B 21/04 |
| | | | | 285/360 |
| 2009/0044655 | A1 | * | 2/2009 | DeLouis .................. B25J 15/04 |
| | | | | 74/490.05 |
| 2009/0151436 | A1 | | 6/2009 | Nagahori et al. |

FOREIGN PATENT DOCUMENTS

| | | |
|---|---|---|
| EP | 0 504 046 A1 | 9/1992 |
| EP | 1 598 634 A2 | 11/2005 |
| FR | 2 983 249 A1 | 5/2013 |
| JP | H04 203682 A | 7/1992 |
| JP | H11 022884 A | 1/1999 |
| WO | WO-2007076750 A1 * | 7/2007 ............ F15B 13/086 |
| WO | WO-2017102878 A1 * | 6/2017 ............ A43C 11/14 |

OTHER PUBLICATIONS

International Search Report, International Application No. PCT/US2014/061718, dated Oct. 22, 2014.

* cited by examiner

*Primary Examiner* — Jonathan P Masinick

(57) ABSTRACT

A carrier assembly for attaching a magnet to a shaft of a valve assembly includes a carrier housing having a magnet holder portion, a shaft holder portion, and a plurality of fingers extending from the shaft holder portion. The carrier assembly includes a locking collar wherein the collar is installed over the carrier housing and moved from a open position to a closed position. The collar is further moved to a locked position to lock the carrier assembly to the shaft.

20 Claims, 6 Drawing Sheets

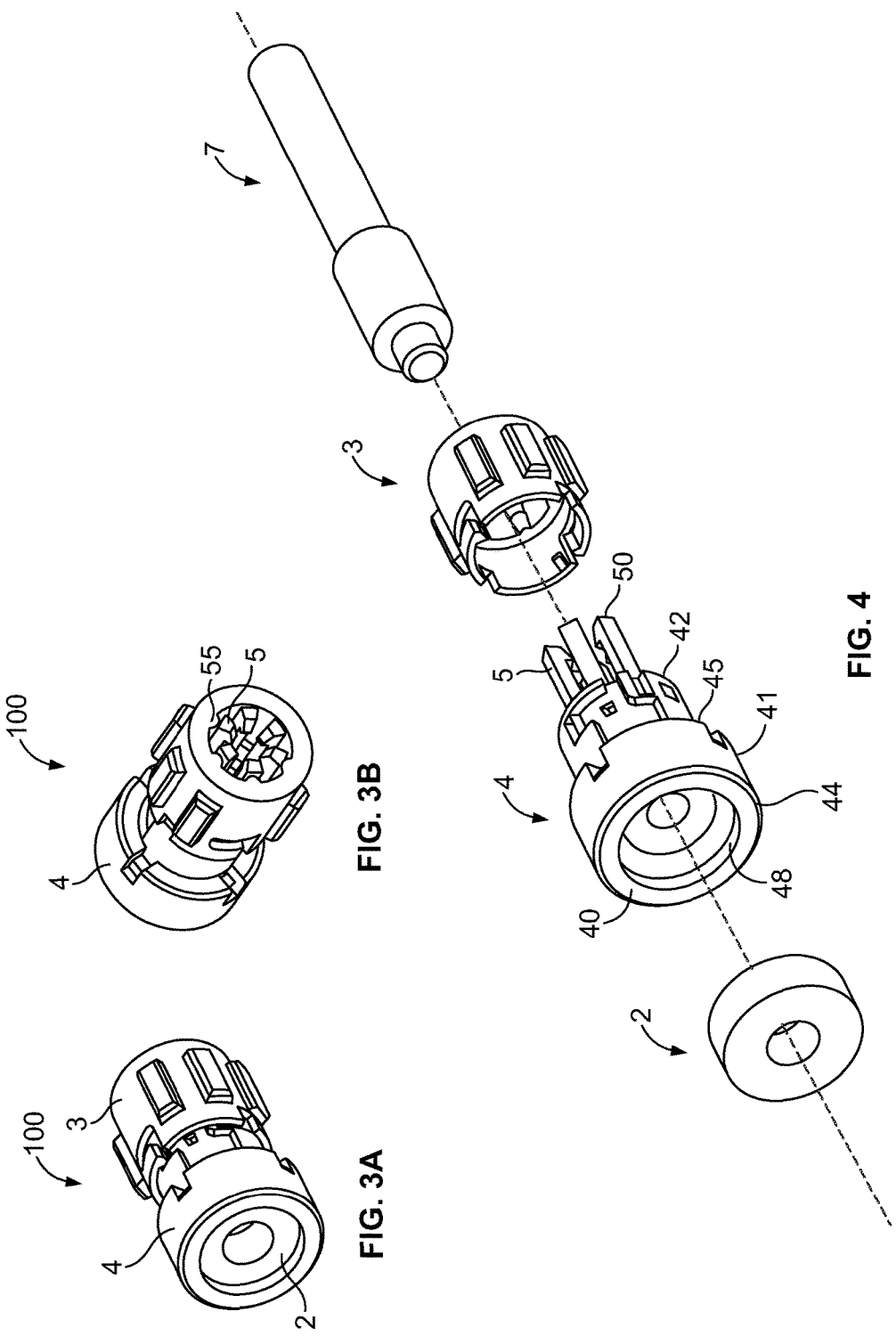

MAGNET CARRIER ASSEMBLY

CROSS REFERENCE TO RELATED APPLICATIONS

This application claims the benefit of U.S. Provisional Application No. 61/894,618 filed Oct. 23, 2013 titled MAGNET CARRIER ASSEMBLY, the subject matter of which is herein incorporated by reference in its entirety.

BACKGROUND OF THE INVENTION

The subject matter herein relates generally to connector assemblies for coupling a magnet and a valve body.

In some current automotive applications a magnet is used to detect the position of a valve or other components. In one such system, a transmission system, the magnet is coupled to a valve for detecting the position of the valve. Some current systems have the magnet over-molded directly to the valve. Other current systems may have the magnet mechanically fastened to the valve. For example, in such systems, the magnet may be encased in a magnet carrier that is then mechanically coupled to the valve.

Current mechanical interfaces using a magnet carrier may require specialized tools to assemble and disassemble the attachment of the magnet to the valve. Additionally, current systems may use mechanical interfaces such as bolts requiring a threaded opening in the valve shaft. Additional or specialized machining may be required to produce the threaded opening. As the shaft size is decreased, the ability to achieve the required connection strength and the machining required for the components makes the current systems more complex and more costly.

A need exists for a magnet carrier assembly having reduced complexity in manufacturing and more ease in assembly.

BRIEF DESCRIPTION OF THE INVENTION

A carrier assembly for attaching a magnet to a shaft of a valve assembly is provided. The carrier assembly includes a carrier housing having a magnet holder portion, a shaft holder portion, and a plurality of fingers extending from the shaft holder portion. The carrier assembly includes a locking collar wherein the collar is installed over the carrier housing and moved from an open position to a closed position. The collar is further moved to a locked position to lock the carrier assembly to the shaft.

A method of assembling a carrier assembly to a shaft is provided. The method comprises mounting a locking collar over the fingers and the shaft holder portion of a carrier housing from a rear end; and retracting the locking collar longitudinally from the rear end of the shaft holder portion toward a front end to an open position to allow the fingers to flex outward; and inserting a shaft into an opening between the fingers; and moving the locking collar longitudinally back from the front end to the rear end to a closed position to cause the fingers to engage a retention feature of the shaft; and rotating the locking collar to a locked position so that the locking collar is locked to the housing, the fingers are locked to the shaft, and the shaft is locked within the carrier assembly.

BRIEF DESCRIPTION OF THE DRAWINGS

FIG. 3A is a front perspective view of a magnet carrier assembly in accordance with an exemplary embodiment.

FIG. 3B is a rear perspective view of a magnet carrier assembly in accordance with an exemplary embodiment.

FIG. 4 is an exploded perspective view of the magnet carrier assembly shown in FIGS. 3A and 3B.

DETAILED DESCRIPTION OF THE INVENTION

Figure 1:
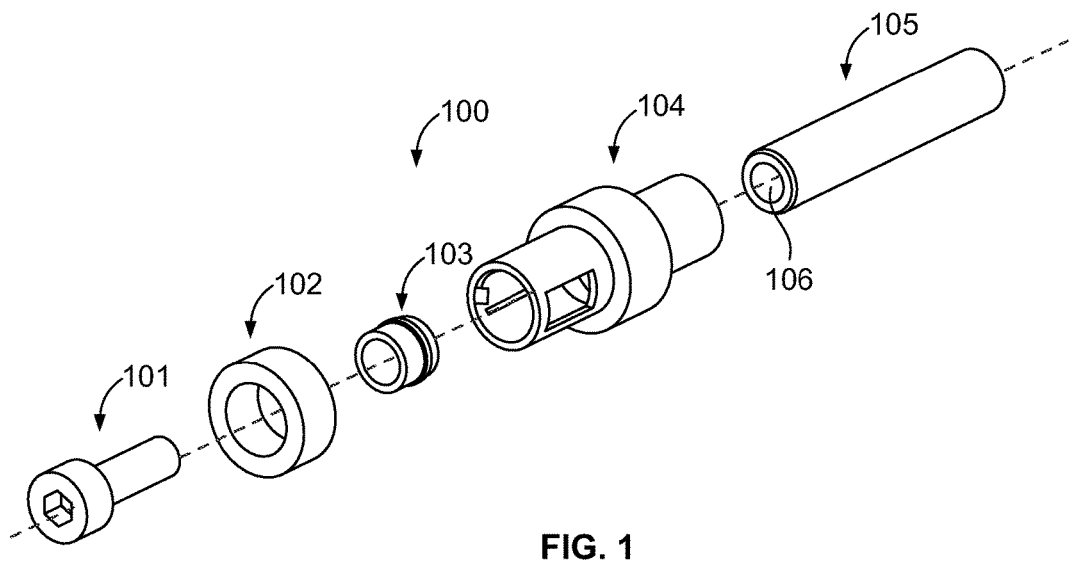
FIG. 1 is an exploded perspective view of a current magnet carrier assembly and a shaft.

FIG. 1 is an exploded perspective view of a current magnet carrier assembly 100 and a shaft 105. The current design utilizes a fastener to mount a magnet 103 to a valve shaft 105. These fastener designs require additional parts and additional manufacturing to provide the required functions. In the example shown in FIG. 1, the existing magnet carrier assembly 100 includes a bolt 101, a magnet 102, a socket 103, a housing 104 and a specially modified valve shaft 105. The bolt 101 is a non-ferrous bolt requiring specified load ratings. The socket 103 is a hex socket for attaching the housing 104 to the bolt 101. The valve shaft 105 includes a tapped opening 106. The opening 106 must be machined to accept and secure the bolt 101. This machining adds additional complexity, manufacturability concerns and the associated costs to the assembly 100.

Figure 2:
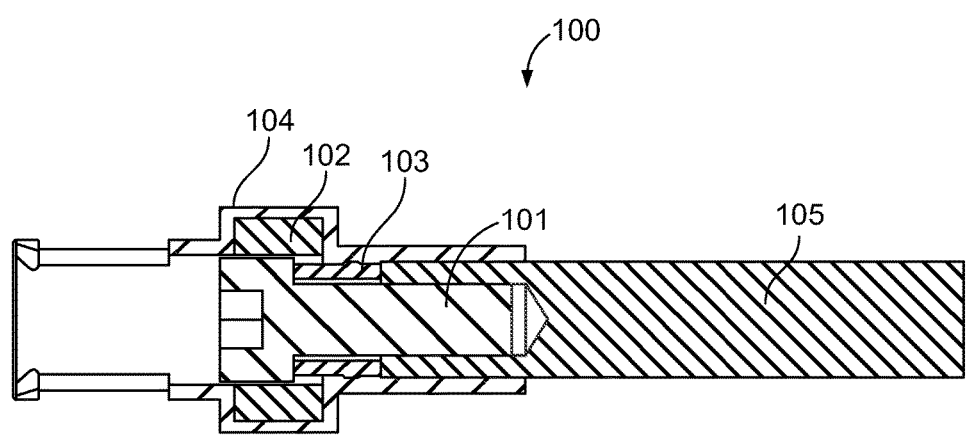
FIG. 2 is a cross sectional view of the assembled magnet carrier assembly of FIG. 1.

FIG. 2 is a cross sectional view of the assembled current magnet carrier assembly of FIG. 1. This design mechanically attaches the magnet to the valve shaft but requires complex manufacturing and assembly. As shown in FIG. 2, the magnet 102 is first over-molded within the housing 104. The socket 103 is inserted within the housing 104. The socket 103 engages specific features such as grooves or detents on the inside surface of the housing 104. The socket 103 is assembled within the housing 104 between the bolt 101 and the shaft 105 to engage the housing 104 and couple the bolt 101 to the housing 104. The bolt 101 is threaded into the opening 106 of the shaft 105. The bolt 101 is inserted into the shaft 105 until the head of the bolt 101 abuts a front surface of the socket 103. When the head of the bolt 101 abuts the front surface of the socket 103, the rear surface of the socket 103 abuts the end surface of the shaft 105. When the bolt 101 is inserted completely, the socket 103 engages the bolt 101 and shaft 105 with the magnet 102 and housing 104. As the shaft 105 rotates, the magnet 102 is moved along the circumference of the shaft 105. Thus, the magnet 102 may be used to detect the position of the valve shaft 105 and accordingly, the position of the valve. However, as the size of the shaft 105 decreases, the complexity of machining the opening 106 increases and the ability to provide a bolt 101 having the required characteristics decreases.

FIG. 3A is a front perspective view of a magnet carrier assembly 1 in accordance with an exemplary embodiment. FIG. 3B is a rear perspective view of a magnet carrier assembly 1. FIG. 4 is an exploded perspective view of the magnet carrier assembly 1. The carrier assembly 1 requires less space, less complex machining and less difficulty to assemble, such as compared to the magnet carrier assembly 100 (shown in FIG. 1). Additionally, the carrier assembly 1 provides a one piece assembly, a reliable locking feature, a design which does not require special assembly or disassembly tools, and a smaller envelope for applications having space limitations.

As shown in FIGS. 3A, 3B, and 4, the carrier assembly 1 comprises a magnet 2, a housing 4, and a locking collar 3. As will be discussed in more detail below, the housing 4 holds the magnet 2. The housing 4 also includes a plurality of flexible fingers 5. The locking collar 3 is retained on the housing 4 in a first position. The locking collar 3 is moved to an open position allowing the fingers 5 to flex open to allow the shaft 7 to be inserted into an opening defined by the plurality of fingers 5 of the magnet carrier assembly 1. The locking collar 3 moves over the fingers 5 to a closed position so that the fingers 5 hold and retain the shaft 7. The locking collar 3 is further moved to a locked position to lock the fingers 5 around the shaft 7 and thereby lock the magnet carrier assembly 1 to the shaft 7.

Figure 5A:
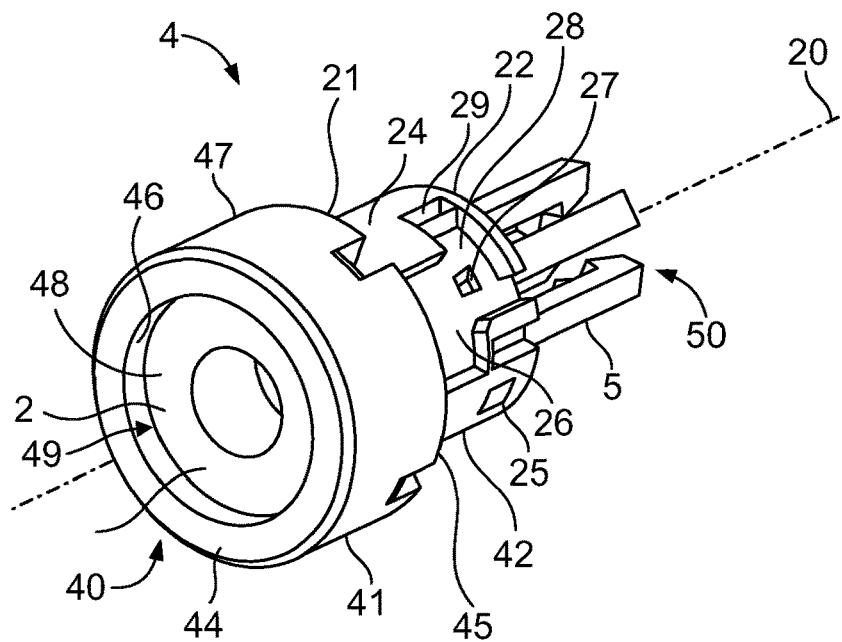
FIG. 5A is a front perspective view of an exemplary embodiment of a housing of the magnet carrier assembly shown in FIG. 4.
Figure 5B:
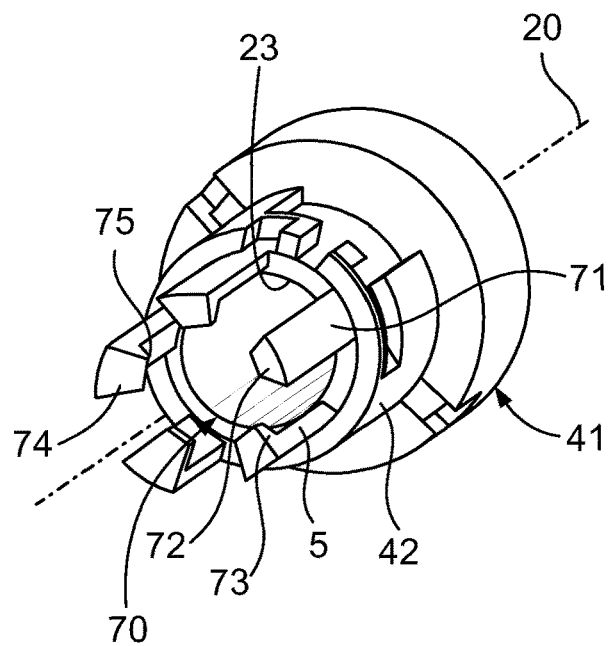
FIG. 5B is a rear perspective view of the housing shown in FIG. 5A.

FIGS. 5A and 5B show front and rear perspective views, respectively, of the housing 4 of the magnet carrier assembly 1. The housing 4 comprises a front 40, a rear 50, a magnet holder portion 41, a shaft holder portion 42 and a plurality of the fingers 5 extending from the shaft holder portion 42. The housing 4 may be a dielectric material such as a plastic or resin and may be fabricated by molding such as injection molding. In an exemplary embodiment, the magnet holder portion 41 and shaft holder portion 42 are generally cylindrical. However, other shapes may be suitable for the magnet holder portion 41 and/or the shaft holder portion 42 to hold a variety of different magnets. In an exemplary embodiment, the magnet holder portion 41 and the shaft holder portion 42 are cylindrical in shape having a channel extending longitudinally along a center axis 20. The magnet holder portion 41 is adjacent the front 40 and includes a front edge 44, a rear edge 45, an inner surface 46 and an outer surface 47. The magnet holder portion 41 includes an opening 48 in the front edge 44 and an opening (not shown) in the rear edge 45. A cavity 49 is defined by the inner surface 46 between the front edge 44 and the rear edge 45. The magnet 2 is held within the cavity 49. In an exemplary embodiment, the magnet 2 is overmolded within the housing 4; however the magnet 2 may be inserted into the housing 4 by other processes in alternative embodiments.

As shown in FIGS. 5A and 5B, the shaft holder portion 42 extends from the rear edge 45 of the magnet holder portion 41. In an exemplary embodiment, the diameter of the shaft holder portion 42 is stepped down from the diameter of the magnet holder portion 41. The shaft holder portion 42 includes a front end 21, a rear end 22, an inner surface 23 and an outer surface 24. The shaft holder portion includes one or more windows 25 extending radially there through. When the magnet carrier assembly 1 and shaft 7 are assembled, the window 25 provides a visual indicator of the proper position of the shaft 7. The shaft holder portion 42 includes one or more recessed areas 26 on the outer surface 24 extending from the front end 21 to the rear end 22. Each recessed area 26 includes one or more alignment projections 27. Each recessed area 26 accepts a projecting latch 51 (shown in FIG. 6) of the locking collar 3 to retain the locking collar 3 on the housing 4 and allows movement of the locking collar 3 in a longitudinal direction along the axis 20 so that the locking collar 3 can move from one position to another position (e.g., from a blocking position to a clearance position). A groove 28 extends circumferentially from the recessed area 26 along the outer surface 24 adjacent the rear end 22 to a distal end. The groove 28 may allow rotational movement of the locking collar 3 so the locking collar 3 can move from one position to another position (e.g., from an unlocked position to a locked position). The groove 28 includes a latch opening 29 at the distal end opposite the recessed area 26. The latch opening 29 accepts and retains the latch 51 (see FIG. 6) of the locking collar 3.

As shown in FIGS. 5A and 5B, a plurality of the flexible fingers 5 extend longitudinally from the rear end 22 of the shaft holder portion 42. In an exemplary embodiment, the fingers 5 extend from the rear end 22 between the inner surface 23 and outer surface 24 at generally evenly spaced intervals and form a ring around an opening 70 along the center axis 20. In an exemplary embodiment, five fingers 5 are shown; however other amounts of fingers 5 are possible in various embodiments. Each finger 5 includes a fixed end 71 adjacent the shaft holder section 42 and a distal free end 72. A latch 73 extends inward toward the opening 70 from the free end 72 of the finger 5. The latch 73 includes a ramp surface 74 and a stop surface 75. The latch 73 mates with a retention feature 77 (see, for example, FIGS. 7 and 9) on the shaft 7.

Figure 6:
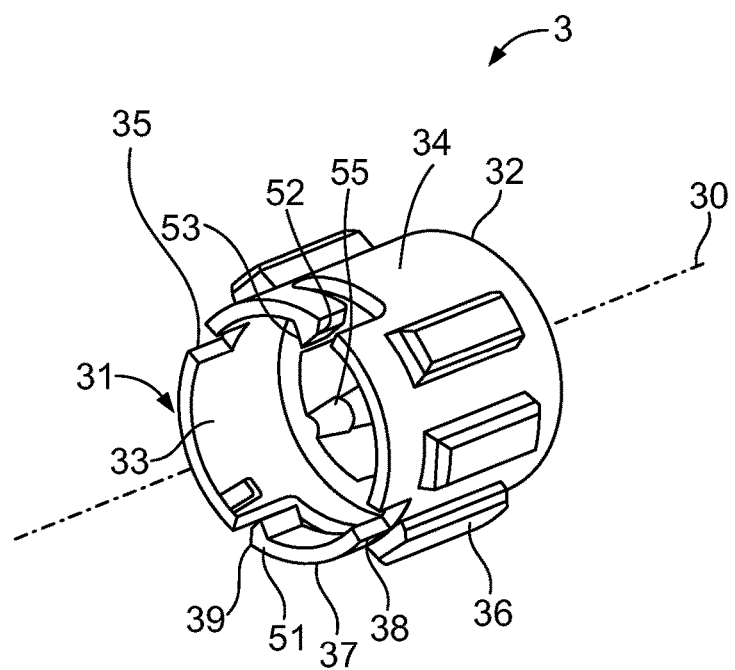
FIG. 6 is a front perspective view of an exemplary embodiment of a locking collar of the magnet carrier assembly.

FIG. 6 is a front perspective view of the locking collar 3 of the magnet carrier assembly 1. The locking collar 3 is a cylinder shape having a front end 31, a rear end 32, an inner surface 33 and an outer surface 34. The locking collar 3 includes a channel extending longitudinally from the front end 31 to the rear end 32 along a center axis 30. The locking collar 3 may be a dielectric material such as a plastic or resin and may be fabricated by molding, such as injection molding. The locking collar 3 includes one or more windows 35 extending radially therethrough. When assembled, the window 35 aligns with the window 25 of the shaft holder portion 42 and provides a visual indicator of the proper position of the shaft 7. The locking collar 3 includes one or more projections 36 extending longitudinally from the outer surface 34. In an exemplary embodiment, the collar 3 includes six projections 36; however other embodiments may have fewer or more projections 36. The projections 36 provide gripping features to manually rotate the locking collar 3.

As shown in FIG. 6, the locking collar 3 includes one or more flexible arms 37 extending circumferentially adjacent the front end 31. The arms 37 each have a fixed end 38 and a free end 39. A latch 51 extends inward toward the channel from the free end 39. The latch 51 includes a ramp surface 52 and a stop surface 53. In the locked position of the locking collar 3, the latch 51 is held within the latch opening 29 (shown in FIG. 5A) to lock the shaft 7 within the carrier assembly 1. As better shown in FIG. 3B, the locking collar 3 includes a plurality of protrusions 55 extending inward from the inner surface 33. In an exemplary embodiment, the protrusions 55 are a rounded knob extending longitudinally from the rear end 32 at generally evenly spaced intervals. The protrusions 55 of the locking collar 3 are spaced on the inner surface 33 around the circumference of the channel to align with the spacing of the fingers 5 of the housing 4. As will be described in more detail, in the locked position of the locking collar 3, the protrusions 55 align with the fingers 5 to prevent movement of the fingers 5 and lock the shaft 7 within the magnet carrier assembly 1.

Figure 7:
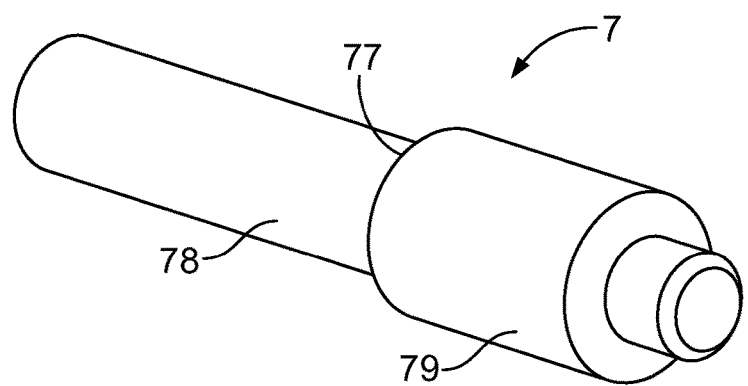
FIG. 7 is a front perspective view of an exemplary embodiment of a shaft for use with the magnet carrier assembly.
Figure 9:
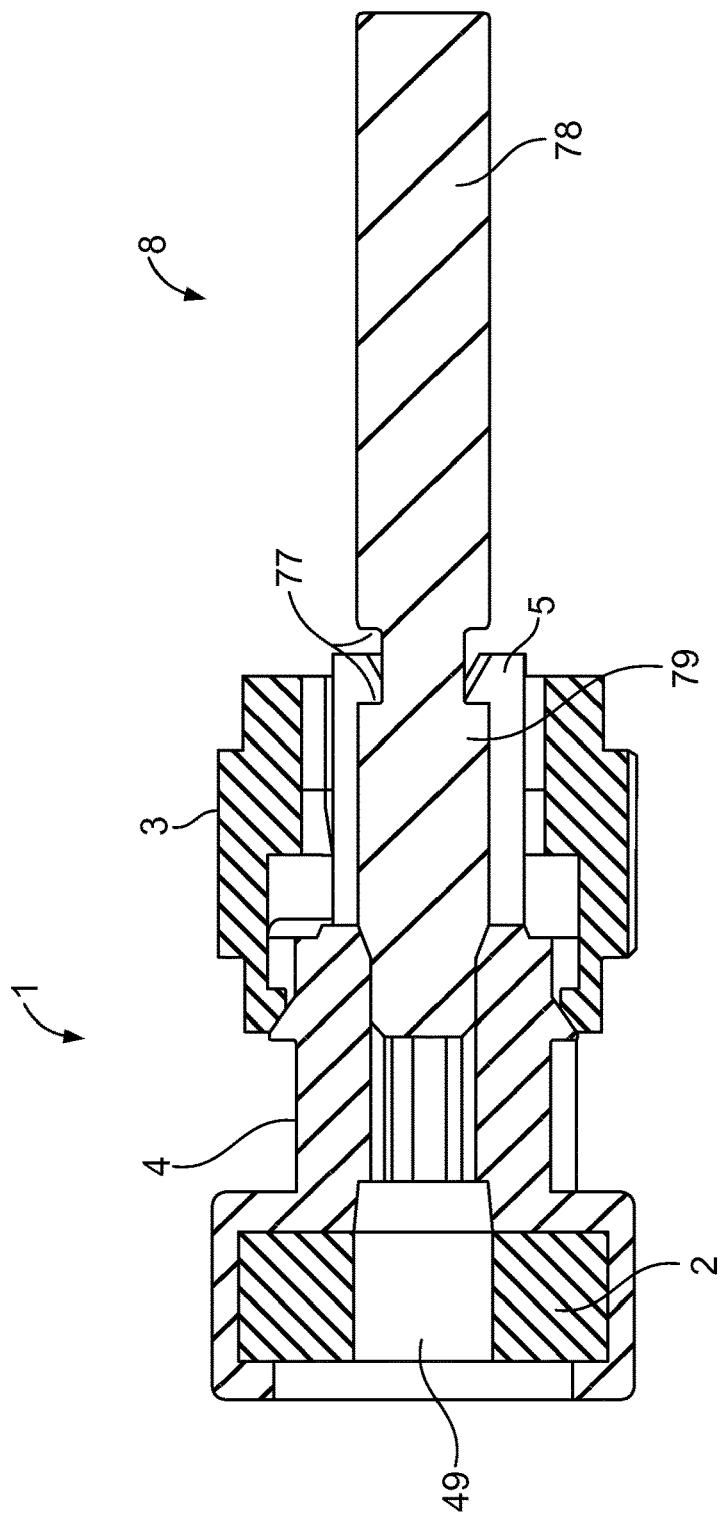
FIG. 9 is a cross section view of the magnet carrier assembly mounted to a shaft in accordance with an exemplary embodiment.

FIG. 7 is a front perspective view of a shaft 7 for use with the magnet carrier assembly 1 (shown in FIG. 4). An alternate embodiment of a shaft 8 is shown in FIG. 9. The shaft 7 includes a retained portion 79 and a connecting portion 78. The connecting portion 78 extends from the valve (not shown). The retained portion 79 is retained within the magnet carrier assembly 1 to mechanically engage the magnet carrier assembly 1 to the shaft 7. The shaft 7 includes a retention feature 77 such as a lip. As shown in FIG. 7, the lip 77 is defined by the step down surface between the retained portion 79 and the connecting portion 78. In the embodiment shown in FIG. 7, the retained portion 79 is a cylinder having a larger diameter than a cylinder of the connecting portion 78. When assembled, the latch 73 (shown in FIG. 5B) of the one or more fingers 5 aligns with the retention feature 77 of the shaft 7. The stop surface 75 (shown in FIG. 5B) abuts the lip 77 to hold the shaft 7 within the magnet carrier assembly 1. As shown in the embodiment illustrated in FIG. 9, the lip 77 is defined by a circumferential channel formed between the retained portion 79 and the connecting portion 78.

Figure 8:
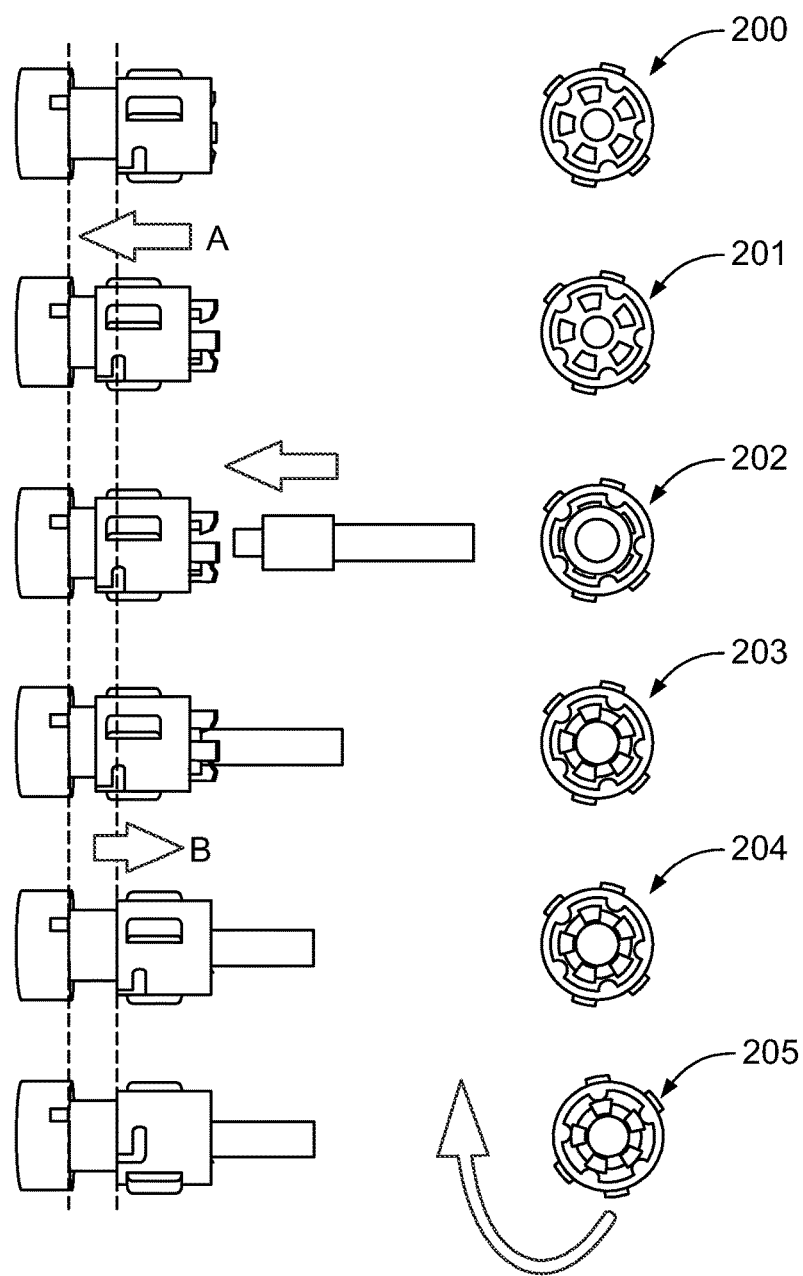
FIG. 8 shows a method of assembling the magnet carrier assembly shown in FIG. 4 and the shaft shown in FIG. 7 in accordance with an exemplary embodiment.

FIG. 8 shows a method of assembling the magnet carrier assembly 1 and the shaft 7. Front and side views of the magnet carrier 1 and shaft 7 are shown for each step of the assembly method.

Step 200 shows the magnet carrier assembly 1 in the at rest position. In the at rest position, the locking collar 3 is engaged with the housing 4. The locking collar 3 is mounted over the fingers 5 and shaft holder portion 42 from the rear end 22 such that the center axis 30 of the locking collar 3 aligns with the center axis 20 of the housing 4. The latch 51 of the locking collar 3 aligns with recessed area 26 of the housing 4 to allow the locking collar 3 to be held on the shaft holder portion 42 of the housing 4.

Step 201 shows the movement of the locking collar 3 in preparation for accepting the shaft 7. The locking collar 3 is moved or retracted longitudinally from the rear end 22 of the shaft holder portion 42 to the front end 21 in a direction A to an open position. As shown in step 201, this allows the fingers 5 to flex outward as the locking collar 3 is in a clearance position providing clearance or room for the outward deflection of the fingers 5.

Step 202 shows positioning and insertion of the shaft 7 into the opening 70 between the fingers 5. When the fingers 5 are deflected outward, the larger diameter retained portion 79 of the shaft 7 may pass into the opening.

Step 203 shows the shaft 7 fully inserted into the magnet carrier assembly 1. The stop surfaces 75 of the fingers 5 are positioned behind the retention feature 77 of the shaft 7.

In step 204, the locking collar 3 is moved longitudinally back from the front end 21 to the rear end 22 in a direction B to a closed position. In the closed position, the locking collar 3 prevents the outward flexing of the fingers to hold the magnet carrier assembly 1 to the shaft 7. As shown in steps 202, 203 and 204, the protrusions 55 of the locking collar 3 are misaligned with the fingers 5 of the housing 4. In this position the protrusions 55 extend into spaces between the fingers 5.

As shown in step 205, the locking collar 3 is rotated to a locked position so that the locking collar 3 is locked to the housing 4. In the locked position, the protrusions 55 align with the fingers 5 to prevent outward movement of the fingers 5, which locks the shaft 7 within the magnet carrier assembly 1. The stop surfaces 75 of the fingers 5 are positioned behind the retention feature 77 of the shaft 7, and thus the fingers 5 are locked to the shaft 7 and the shaft 7 is locked within the magnet carrier assembly 1. In the locked position, the locking collar 3 is locked to the housing 4 by the latch 51 of the locking collar 3 locked within the latch opening 29 of the housing 4. As the latch 51 engages the latch opening 29, a tactile or audible click may be provided to ensure proper locking. In the locked position, the fingers 5 are locked to the shaft 7 by the latches 73 of the fingers 5 locked to the shaft retention feature 77. In the locked position, the window 25 of the housing 4 aligns with the window 35 of the locking collar 3 to provide visual confirmation that the shaft 7 is fully loaded.

FIG. 9 is a cross section view of the magnet carrier assembly 1 mounted to a shaft 8 formed in accordance with an exemplary embodiment. The housing 4 and locking collar 3 are mounted to the shaft 8. The magnet 2 is held within the housing 4. The shaft 8 includes the retained portion 79 and the connecting portion 78. A channel 80 is located between the retained portion 79 and the connecting portion 78. The channel 80 defines the retention feature 77 at the rear end of the retained portion 79. The fingers 5 of the housing 4 are locked to the shaft 8 at the retention feature 77. As described above, the fingers 5 are locked into the position by the locking collar 3.

The magnet carrier assembly 1 provides numerous advantages over the current designs. The design of the magnet carrier assembly 1 requires low insertion force during mounting and provides high retention force after loading and locking. The locking spring features and visual and tactile indications verify proper placement of the magnet carrier assembly 1 onto the shaft.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

What is claimed is:

1. A carrier assembly for attaching a magnet to a shaft of a valve assembly, the carrier assembly comprising:
   a housing having a magnet holder portion, a shaft holder portion, and a plurality of fingers extending from the shaft holder portion;
   a locking collar, wherein the locking collar is a cylinder having a front end, a rear end, an inner surface, an outer surface, and a channel extending longitudinally from the front end to the rear end along a center axis, and further comprising one or more arms extending circumferentially adjacent the front end; and wherein the locking collar is installed over the housing and moved from an open position to a closed position to engage the carrier assembly with the shaft, and wherein the locking collar is further moved to a locked position to lock the carrier assembly to the shaft.

2. The carrier assembly of claim 1, wherein the locking collar is moved from the closed position to the locked position using a rotating motion.

3. The carrier assembly of claim 1, wherein the shaft holder portion has a front end, a rear end, an inner surface, and an outer surface and further comprises one or more recessed areas on the outer surface.

4. The carrier assembly of claim 3, wherein the shaft holder portion further comprises one or more grooves extending circumferentially along the outer surface from the recessed area to a distal end, and wherein each of the one or more grooves has a latch opening at the distal end.

5. The carrier assembly of claim 1, further comprising projections extending longitudinally from the outer surface.

6. The carrier assembly of claim 1, wherein the arms comprise a fixed end and a free end and wherein a latch extends inward from the free end.

7. The carrier assembly of claim 1, further comprising a plurality of protrusions extending inward from the inner surface.

8. The carrier assembly of claim 1, wherein each of the plurality of fingers comprises a fixed end and a free end, and wherein each of the fingers further comprises a latch extending inward from the free end.

9. The carrier assembly of claim 1, where in the locked position, a window of the housing aligns with a window of the locking collar to provide visual confirmation that the shaft is fully loaded.

10. The carrier assembly of claim 1, wherein
the shaft holder portion comprises a cylinder having an outer surface, one or more recessed areas on the outer surface, and one or more grooves extending circumferentially along the outer surface from the recessed area to a distal end, and wherein each of the one or more grooves has a latch opening at the distal end; and
wherein the locking collar comprises a front end and a rear end, and one or more arms extending circumferentially adjacent the front end, and wherein each of the one or more arms has a fixed end and a free end and a latch extending inward from the free end; and
wherein each of the plurality of fingers extending longitudinally from the shaft holder portion comprises a fixed end adjacent the shaft holder portion and a free end, and wherein each of the fingers further comprises a latch extending inward from the free end; and
wherein the locking collar latch engages the latch opening of the shaft holder portion to lock the locking collar onto the housing, and
wherein the latch of each of the plurality of fingers is configured to engage the shaft to hold the carrier assembly to the shaft.

11. The carrier assembly of claim 10, wherein the locking collar further comprises an inner surface and a plurality of protrusions extending inward from the inner surface, and wherein the locking collar is rotated to a locked position and the protrusions align with the fingers of the shaft holder portion to lock the fingers to the shaft.

12. A carrier assembly for attaching a magnet to a shaft of a valve assembly, the carrier assembly comprising:
a housing having a magnet holder portion, a shaft holder portion, and a plurality of fingers extending from the shaft holder portion, wherein the shaft holder portion has a front end, a rear end, an inner surface, and an outer surface and further comprises one or more recessed areas on the outer surface, the shaft holder portion further comprising one or more grooves extending circumferentially along the outer surface from the recessed area to a distal end, wherein each of the one or more grooves has a latch opening at the distal end; and
a locking collar, wherein the locking collar is installed over the housing and moved from an open position to a closed position to engage the carrier assembly with the shaft, and wherein the locking collar is further moved to a locked position to lock the carrier assembly to the shaft.

13. The carrier assembly of claim 12, wherein the locking collar comprises a front end and a rear end, and one or more arms extending circumferentially adjacent the front end; and
wherein each of the one or more arms has a fixed end and a free end and a latch extending inward from the free end; and
wherein each of the plurality of fingers extending longitudinally from the shaft holder portion comprises a fixed end adjacent the shaft holder portion and a free end, and wherein each of the fingers further comprises a latch extending inward from the free end; and
wherein the locking collar latch engages the latch opening of the shaft holder portion to lock the locking collar onto the housing, and
wherein the latch of each of the plurality of fingers is configured to engage the shaft to hold the carrier assembly to the shaft.

14. The carrier assembly of claim 13, wherein the locking collar further comprises an inner surface and a plurality of protrusions extending inward from the inner surface, and wherein the locking collar is rotated to a locked position and the protrusions align with the fingers of the shaft holder portion to lock the fingers to the shaft.

15. The carrier assembly of claim 12, wherein the locking collar is a cylinder having a front end, a rear end, an inner surface, an outer surface, and a channel extending longitudinally from the front end to the rear end along a center axis, and further comprising one or more arms extending circumferentially adjacent the front end.

16. The carrier assembly of claim 12, where in the locked position, a window of the housing aligns with a window of the locking collar to provide visual confirmation that the shaft is fully loaded.

17. A carrier assembly for attaching a magnet to a shaft of a valve assembly, the carrier assembly comprising:
a housing having a magnet holder portion, a shaft holder portion, and a plurality of fingers extending from the shaft holder portion, the housing having a window; and
a locking collar having a window, wherein the locking collar is installed over the housing and moved from an open position to a closed position to engage the carrier assembly with the shaft, and wherein the locking collar is further moved to a locked position to lock the carrier assembly to the shaft, and wherein, the locked position, the window of the housing aligns with the window of the locking collar to provide visual confirmation that the shaft is fully loaded.

18. The carrier assembly of claim 17, wherein the shaft holder portion has a front end, a rear end, an inner surface, and an outer surface and further comprises one or more recessed areas on the outer surface, the shaft holder portion further comprising one or more grooves extending circumferentially along the outer surface from the recessed area to a distal end, wherein each of the one or more grooves has a latch opening at the distal end.

19. The carrier assembly of claim 17, wherein the locking collar comprises a front end and a rear end, and one or more arms extending circumferentially adjacent the front end; and wherein each of the one or more arms has a fixed end and a free end and a latch extending inward from the free end; and wherein each of the plurality of fingers extending longitudinally from the shaft holder portion comprises a fixed end adjacent the shaft holder portion and a free end, and wherein each of the fingers further comprises a latch extending inward from the free end; and wherein the locking collar latch engages the latch opening of the shaft holder portion to lock the locking collar onto the housing, and wherein the latch of each of the plurality of fingers is configured to engage the shaft to hold the carrier assembly to the shaft; and wherein the locking collar further comprises an inner surface and a plurality of protrusions extending inward from the inner surface, and wherein the locking collar is rotated to a locked position and the protrusions align with the fingers of the shaft holder portion to lock the fingers to the shaft.

20. The carrier assembly of claim 17, wherein the locking collar is a cylinder having a front end, a rear end, an inner surface, an outer surface, and a channel extending longitudinally from the front end to the rear end along a center axis, and further comprising one or more arms extending circumferentially adjacent the front end.

\* \* \* \* \*